A. B. THOMAS.
WIND SHIELD FOR AUTOMOBILES.
APPLICATION FILED FEB. 26, 1910.
999,350.
Patented Aug. 1, 1911.
2 SHEETS—SHEET 1.
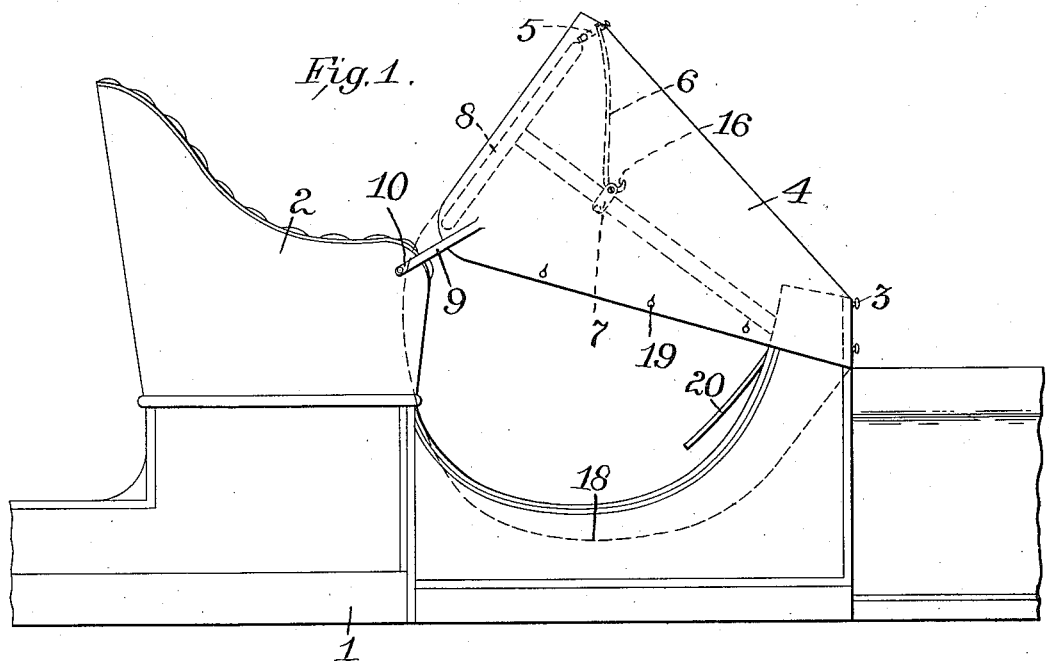
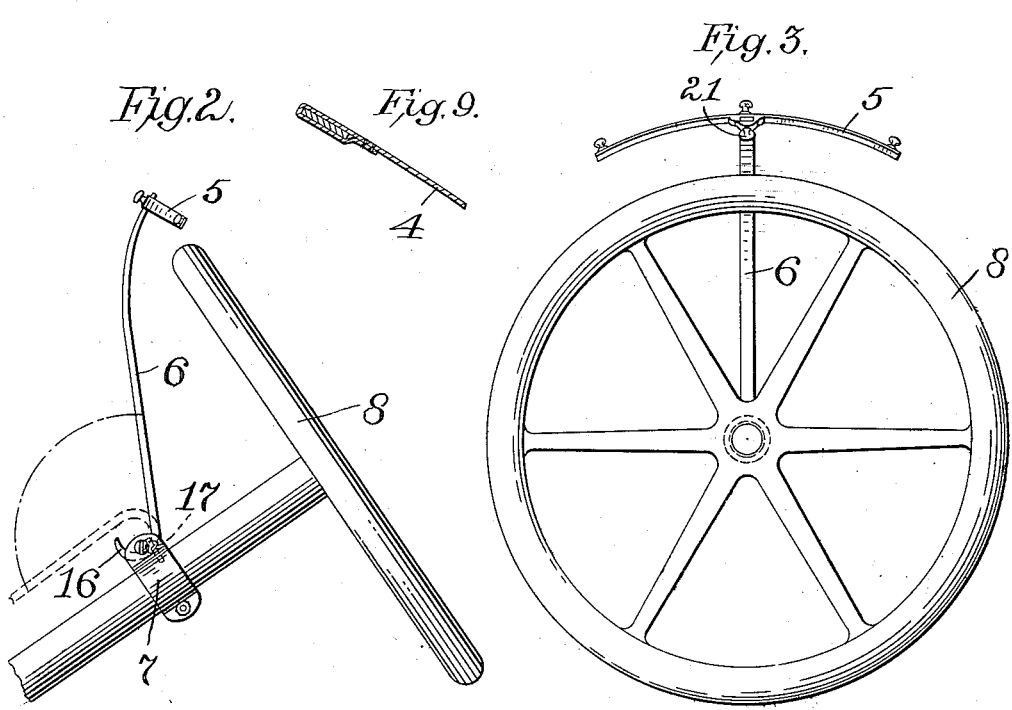
Attest:
Ewd L. Tolson
Bent M. Stahl
Inventor:
Almer B. Thomas,
by Spear Middleton Donaldson & Spear
Atty's A. B. THOMAS.
WIND SHIELD FOR AUTOMOBILES.
APPLICATION FILED FEB. 26, 1910.
999,350.
Patented Aug. 1, 1911.
2 SHEETS—SHEET 2.
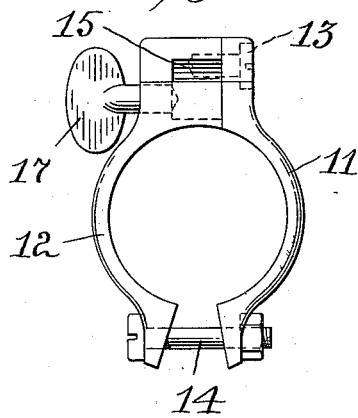
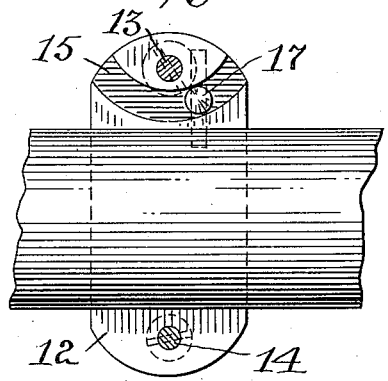
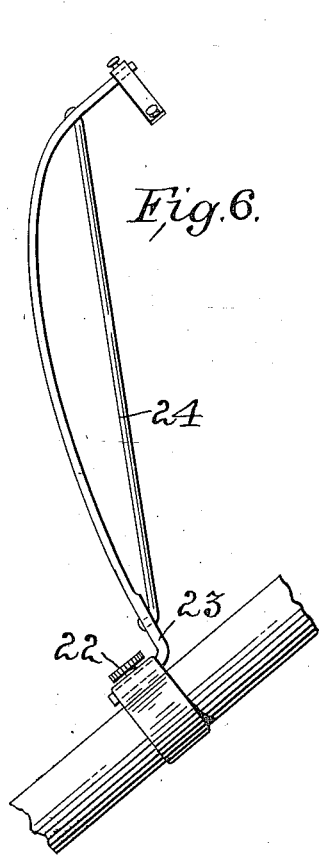
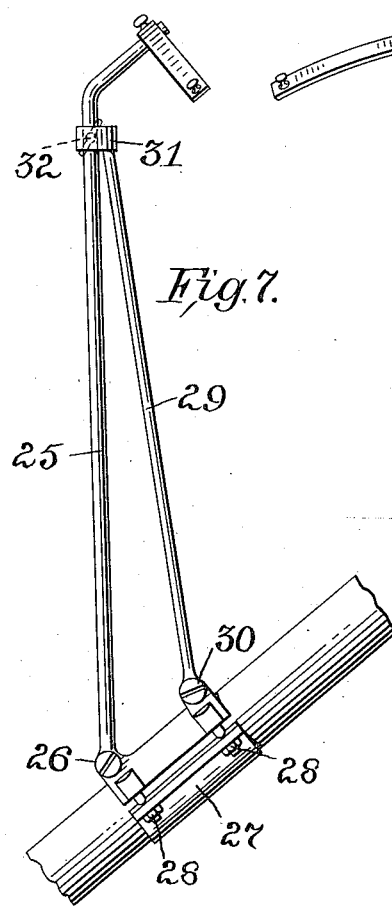
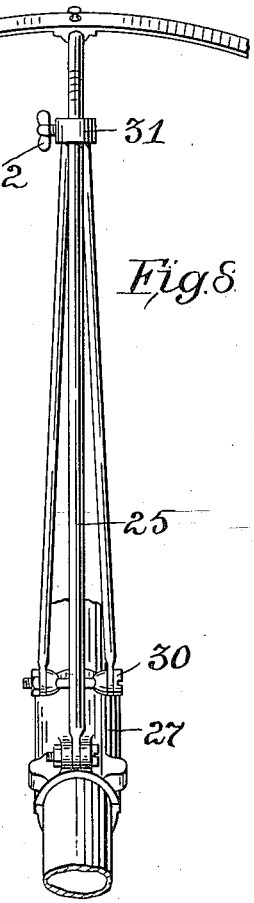
Attest:
Ewd L. Tolson.
Bent M. Stahl
Inventor:
Almer B. Thomas,
by Spear Middleton Donaldson & Spear
Attys.

UNITED STATES PATENT OFFICE.

ALMER B. THOMAS, OF HARDWICK, VERMONT.

WIND-SHIELD FOR AUTOMOBILES.

999,350.     Specification of Letters Patent.     Patented Aug. 1, 1911.

Application filed February 26, 1910. Serial No. 546,254.

*To all whom it may concern:*

Be it known that I, ALMER B. THOMAS, citizen of the United States, residing at Hardwick, Vermont, have invented certain new and useful Improvements in Wind-Shields for Automobiles, of which the following is a specification.

My invention relates to devices for the protection of persons riding on the front seat of an automobile, and especially the driver.

One object of my invention is to dispense with the use of the ordinary plate glass wind shield, and also of the celluloid front curtain which is now used to protect the driver or occupants of the front seat.

One objection to the use of the present wind shield as made of glass is that it is heavy and cumbersome, and the vision of the driver is obstructed particularly when the glass is coated with rain, sleet or snow. A like objection exists against the use of the celluloid front.

I aim to provide a shield or protector which will not obstruct the vision of the driver, and yet will afford the necessary protection against the wind and weather.

The invention consists in the features and combination and arrangement of parts hereinafter described and particularly pointed out in the claims.

In the accompanying drawings:—Figure 1 is a side view of so much of an automobile body as is necessary to a clear understanding of my invention; my improvement being shown in connection therewith; Fig. 2 is a detail side view of a portion of my invention; Fig. 3 is a detail rear view; Figs. 4 and 5 are views of a supporting bracket; Fig. 6 is a view of a modified form of support; Figs. 7 and 8 are views of a further modification; Fig. 9 is a sectional detail.

In these drawings, 1 indicates a portion of an automobile body of any known type having a seat at 2. The protector or wind shield consists of a sheet of leather, canvas, or other suitable material attached to the dashboard at 3, and extending upwardly and rearwardly at an inclination, and at a distance above the steering post, said sheet of material being marked 4. This protector, at its rear portion, is supported by a curved bar 5 in turn supported by an arm or bracket 6 extending downwardly and connected with a clamp 7 supported on the steering post. The bar 5 is curved substantially concentric with the steering wheel 8, and lies in a plane slightly above the upper edge of the said steering wheel so that the sheet material of the protector curves from side to side at its upper edge substantially concentric with the wheel 8, and its depending sides reach far enough down to afford protection to the body and legs and feet of the driver or occupant of the front seat. These depending sides may be attached to the seat frame of the automobile by straps as at 9, which may be suitably attached to the rear corners of the depending sides of the boot or protector, and having their free ends attached by a suitable button at 10 to the seat frame. The boot or protector is preferably attached to the curved supporting bar 5 by buttons of the snap variety, though I do not limit myself in this respect.

The clamp or collar 7 may be of any suitable form, and as a representative form I show in Figs. 4 and 5 a clamp made of two sections 11 and 12 adapted to fit about the steering post and held thereon by a screw at 13 passing from one section into the other, and a clamping bolt at 14. The member 12 of the clamp or collar has a curved groove 15 formed therein which receives the lower curved end 16 of the standard or support 6, and a thumb screw 17 passes through one side of the clamp and engages this curved end of the standard to hold the same in any position to which it may be adjusted.

As shown in Fig. 1, the depending sides of the boot may reach only part way down the side openings at the front of the automobile, or as shown by the dotted lines at 18, I may provide extension flaps, one for each side of the boot or protector, which are secured to the depending edges by any suitable fastening devices such as snap buttons indicated generally at 19. By these extensions the side openings are entirely closed, and the driver or occupant of the seat will be completely protected as to his body, feet and legs, both from the front and from the side of the machine. The boot reaches high enough and far enough to the rear to fully protect the hands of the operator in manipulating the wheel, and it will be observed that while full protection is afforded for the body and the lower extremities and the hands of the operator, his vision will not be obstructed.

When it is not desired to use the shield or protector, the boot may be detached at the points 10 and also from the curved upper bar 5, and it may then be rolled forwardly and suitably packed at the dashboard, being held by any suitable straps indicated generally at 20. In so packing the boot or protector, the cross bar 5 may be removed from the standard 6, and rolled within the material of the boot or protector, while the standard or arm 6 and bar 5 may be similarly disposed of, or they may be left in connection with the clamp or collar, and simply folded down into the position indicated in Fig. 2 in dotted lines, for which purpose it is only necessary to loosen the set screw 17 and turn the curved end of the supporting arm in the curved slot 15. The cross bar 5 is held to the standard or arm 6 by a set screw 21, rendering it easy to remove the cross bar when desired. The shield or boot may be stiffened along its top edge by means of a fold or hem of suitable width, with some suitable stiffening material as leather within this hem, so that it will retain the curved form of the cross arm 5 beyond the ends of said arm, thus making the boot at the rear of sufficient width for the occupant or occupants of the front seat. The main portion of the boot or shield may be made of heavy leather, and may, if preferred, be lined with cloth, while the side flaps or detachable portions may be formed of lighter material adapted to be buttoned or otherwise secured to the main portion. The main portion of the boot is of such width that it can be rolled down onto the dash for storage without interfering with the side lamps.

In Fig. 6 I show another form of the support, this differing from the form first described mainly in the means for attaching the said support to the clamp, consisting in this case of a thumb screw 22 engaging the bent foot 23 of the support, and in the use of a brace 24. The clamp is also of slightly different form from that first described.

In Figs. 7 and 8 I show a further modification of the support for the upper curved cross bar, and also a modification of the clamp. The support in this case consists of a bar 25 pivoted at 26 to the clamp 27 held by the bolts 28 onto the steering post, and a brace 29 pivoted at 30 to the clamp and carrying a collar 31 which may be set on the main support 25 by a thumb screw 32. This construction also permits the adjustment of the support to different angles.

I claim as my invention:—

1. In combination with a steering post and dash, a protector secured to the dash at its front end, and a support for the rear upper end of the protector, with means for detachably securing the said support to the steering post, and means for folding the support on the post, substantially as described.

2. In combination with the steering post, a clamp thereon having a curved groove therein, a post having a curved end to move in the said groove, and a shield or boot held at the upper end of the support with means for holding the curved end of the support adjustably to the clamp, substantially as described.

3. In combination with an inclined steering post, an upwardly extending support attached thereto, a cross arm at the upper end of said support, a sheet of material secured to said cross arm extending downwardly and forwardly and having means for attachment to the dash, and connections between the said sheet of material and the seat frame, said connections extending rearwardly from the sheet of material, substantially as described.

4. In combination with an inclined steering post, a wheel, a support attached to the said post and extending upwardly, a cross arm at the upper end of the said support, a sheet of material attached thereto and extending downwardly and forwardly, means for attaching the said material at its front end to the dash, and sides detachably buttoned to the lateral edges of the said sheet of material to close the side entrances, substantially as described.

In testimony whereof I affix my signature in presence of two witnesses.

ALMER B. THOMAS.

Witnesses:
GEORGE A. JONES,
EDWIN H. THOMAS.